United States Patent
Ahuja et al.

(10) Patent No.: US 10,579,407 B2
(45) Date of Patent: Mar. 3, 2020

(54) SYSTEMS AND METHODS FOR DEPLOYING MICROSERVICES IN A NETWORKED MICROSERVICES SYSTEM

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US); Rajiv Sreedhar, Sunnyvale, CA (US)

(73) Assignee: SHIELDX NETWORKS, INC., San Jose, CA (US)

( * ) Notice: Subject to any disclaimer, the term of this patent is extended or adjusted under 35 U.S.C. 154(b) by 168 days.

(21) Appl. No.: 15/338,001

(22) Filed: Oct. 28, 2016

(65) Prior Publication Data
US 2018/0121221 A1    May 3, 2018

(51) Int. Cl.
*G06F 9/455* (2018.01)
*H04L 29/06* (2006.01)

(52) U.S. Cl.
CPC .......... *G06F 9/45558* (2013.01); *H04L 63/02* (2013.01); *H04L 63/166* (2013.01); *G06F 2009/4557* (2013.01); *G06F 2009/45587* (2013.01)

(58) Field of Classification Search
CPC ..... G06F 9/4881–4893; G06F 9/45558; G06F 2009/45587; G06F 2009/4557; H04L 63/166; H04L 63/02
USPC .......................................................... 718/1
See application file for complete search history.

(56) References Cited

U.S. PATENT DOCUMENTS

| | | | | |
|---|---|---|---|---|
| 8,997,093 B2 * | 3/2015 | Dimitrov | ................... | G06F 8/61 718/1 |
| 9,467,476 B1 * | 10/2016 | Shieh | ....................... | H04L 63/20 |
| 2010/0269109 A1 * | 10/2010 | Cartales | ................ | G06F 9/5072 718/1 |
| 2010/0274890 A1 * | 10/2010 | Patel | ...................... | G06F 9/4862 709/224 |
| 2010/0299437 A1 * | 11/2010 | Moore | ................ | H04L 67/1008 709/226 |

(Continued)

OTHER PUBLICATIONS

Bernard Golden, "3 reasons why you should always run microservices apps in containers", techbeacon.com/app-dev-testing/3-reasons-why-you-should-always-run-microservices-apps-containers, May 2016 (Year: 2016).*

*Primary Examiner* — Francisco J Aponte
*Assistant Examiner* — Kevin X Lu
(74) *Attorney, Agent, or Firm* — Nicholson De Vos Webster & Elliott LLP

(57) ABSTRACT

Systems and methods are described herein generally relating to network security, and in particular, embodiments described relate to systems and methods for deploying microservices in a networked microservices system. For example, a method is disclosed, which calls for receiving a request to instantiate a microservice, selecting a suitable virtual machine (VM), wherein the selecting comprises calculating the suitability of the virtual machine based on a property load and a property weight, deploying the microservice on the selected virtual machine, configuring the microservice to communicate with an interface microservice, and configuring the microservice to perform security processing on packets processed within a security service.

18 Claims, 14 Drawing Sheets

(56) References Cited

U.S. PATENT DOCUMENTS

| | | | | |
|---|---|---|---|---|
| 2012/0131573 A1* | 5/2012 | Dasari | ................ | G06F 9/45558 |
| | | | | 718/1 |
| 2015/0295854 A1* | 10/2015 | Sun | ...................... | G06F 9/4887 |
| | | | | 709/226 |
| 2018/0034832 A1* | 2/2018 | Ahuja | ................ | H04L 63/1408 |
| 2018/0046446 A1* | 2/2018 | Turovsky | .................. | G06F 8/65 |
| 2018/0077080 A1* | 3/2018 | Gazier | .................. | H04L 47/803 |
| 2018/0115514 A1* | 4/2018 | Chou | ................ | G06F 9/45558 |

\* cited by examiner

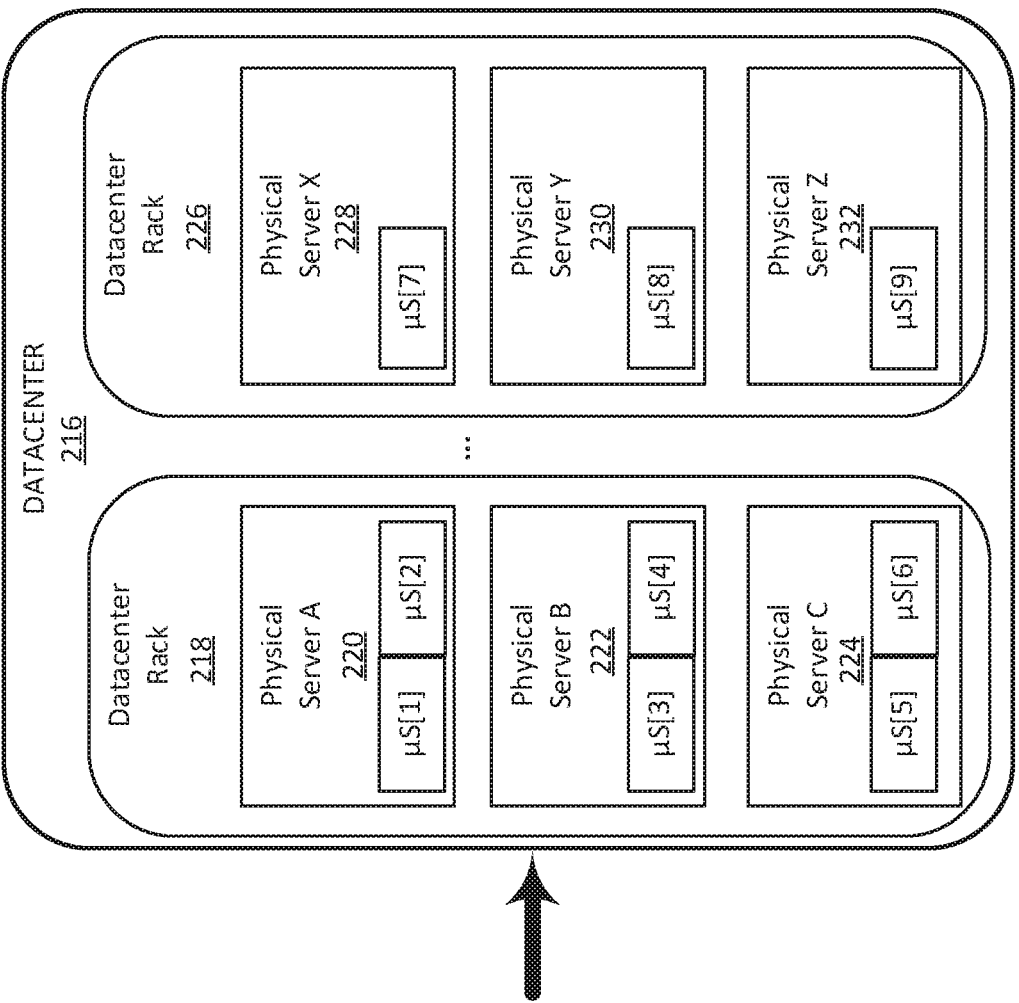
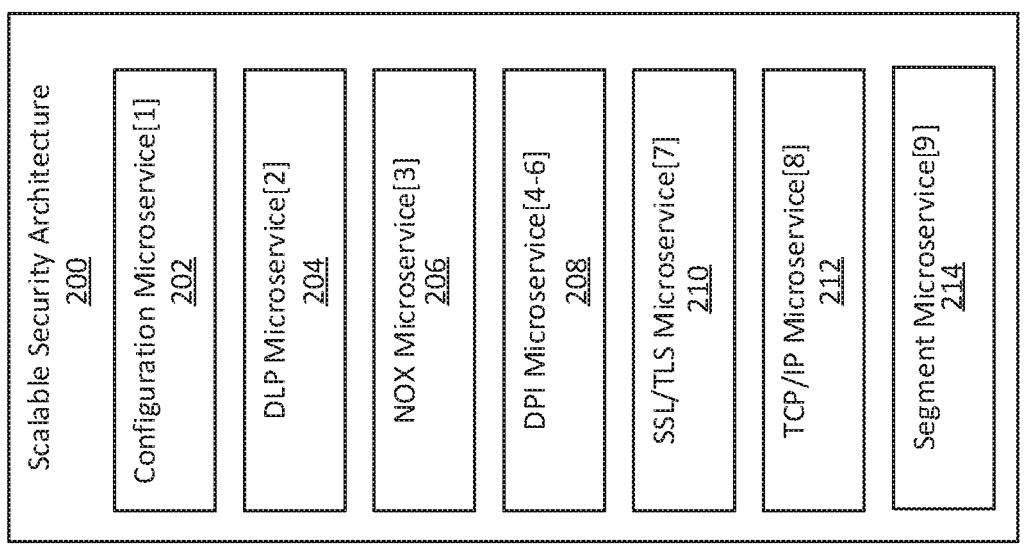
FIG. 2

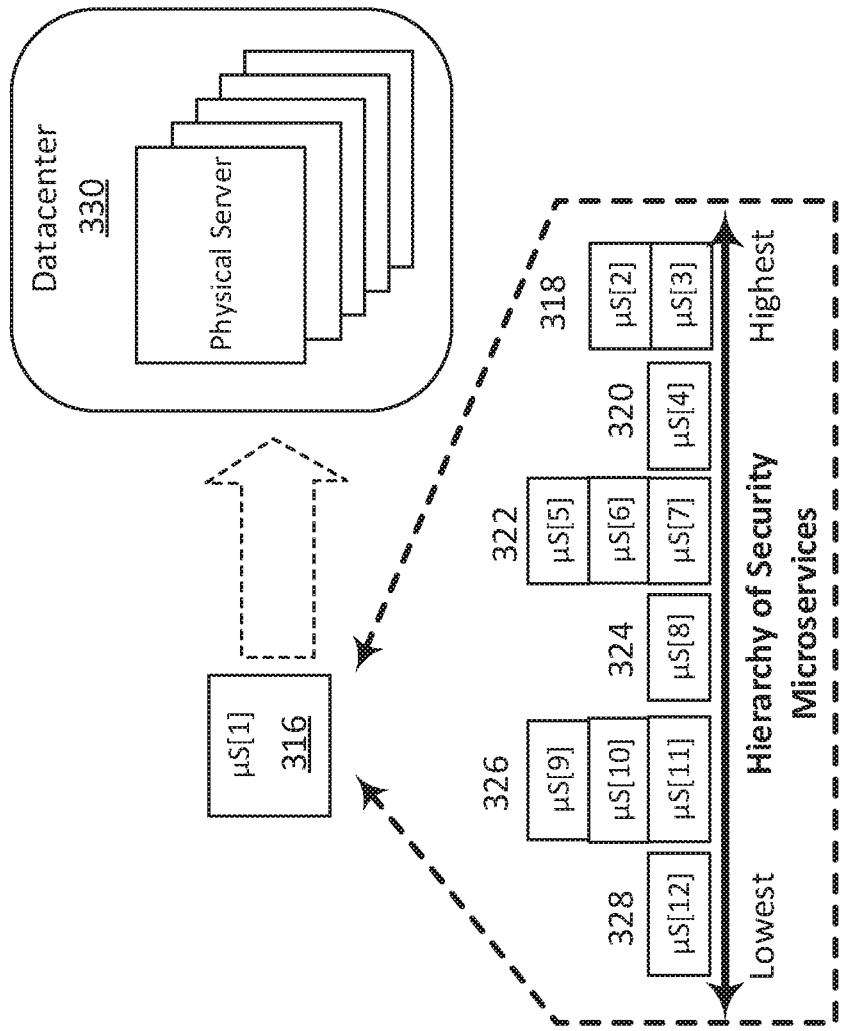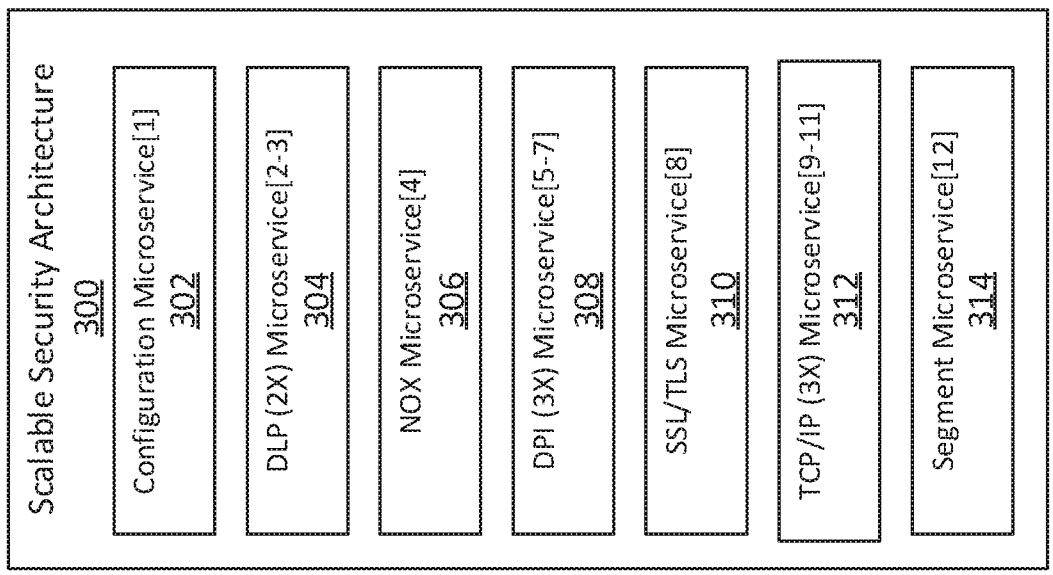
FIG. 3

SYSTEMS AND METHODS FOR DEPLOYING MICROSERVICES IN A NETWORKED MICROSERVICES SYSTEM

TECHNICAL FIELD

Embodiments described herein generally relate to network security. In particular, embodiments described relate to systems and methods for deploying microservices in a networked microservices system.

BACKGROUND INFORMATION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The expansion of cloud computing services has led to a need for data traveling between servers and client applications to be monitored for security. Datacenters housing collections of at least one server to act as a host machine to provide computing capacity to host at least one virtual machine acting as a guest machine, which in turn provides a computing environment to execute at least one security microservice. As the flow of data through the datacenter increases, new microservices need to be deployed either on an existing virtual machine or a newly-instantiated virtual machine. Selecting where to deploy a new microservice can affect data center efficiency, performance, and balancing, to name a few.

BRIEF DESCRIPTION OF THE DRAWINGS

The various advantages of the embodiments disclosed herein will become apparent to one skilled in the art by reading the following specification and appended claims, and by referencing the drawings, in which:

FIG. 2 illustrates an embodiment of a scalable security architecture implementing a three-time scale out using security microservices;

FIG. 3 illustrates an arbitrary scaling out of a microservice according to an embodiment;

DETAILED DESCRIPTION

Figure 1:
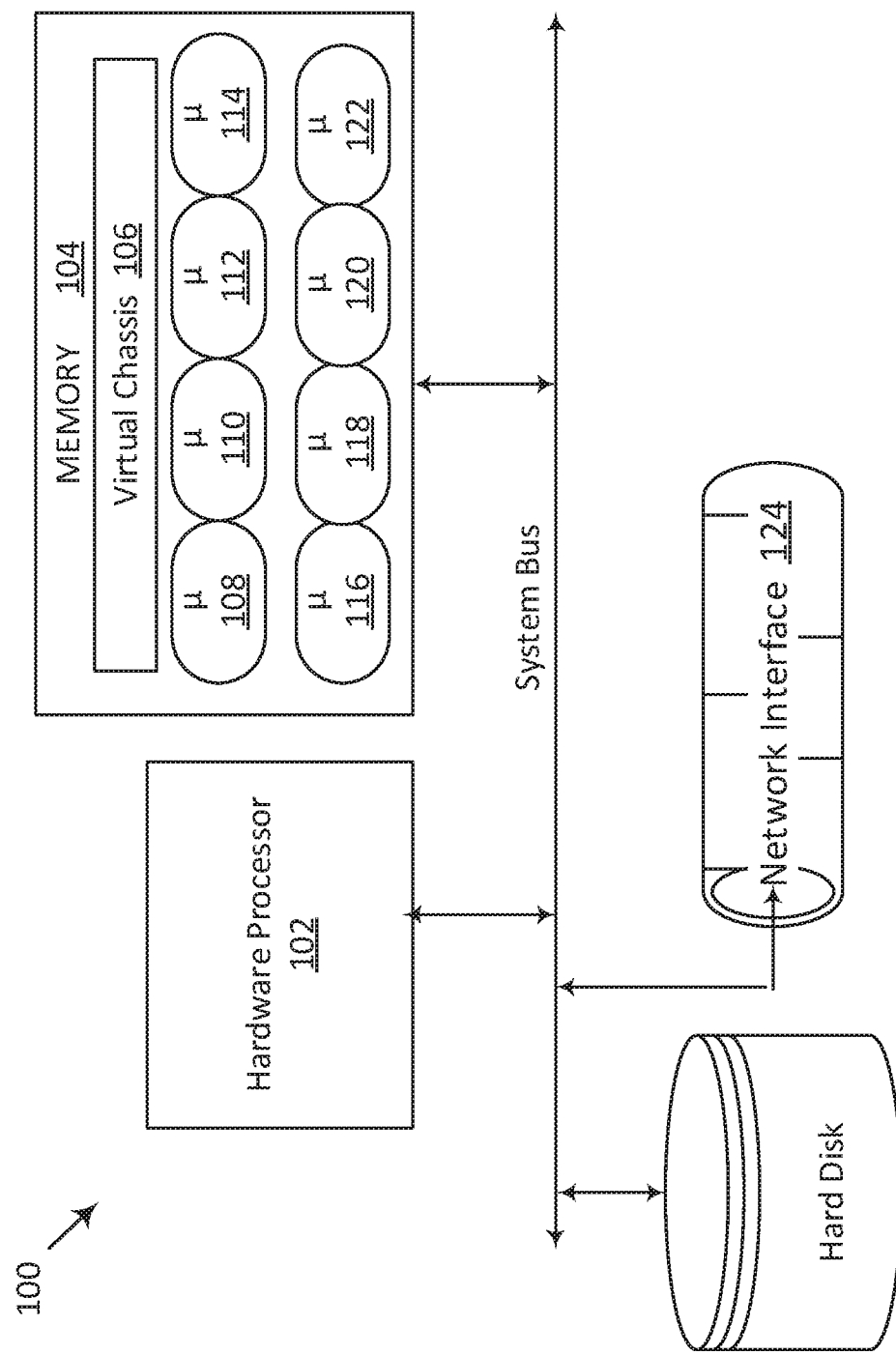
FIG. 1 is a block diagram illustrating computer hardware for loading network security system microservices from a memory and executing them by a processor.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A security system that monitors network traffic often includes multiple interface microservices and multiple security microservices, such as an interface microservice, a TCP/IP security microservice, a DPI security microservice, and an SSL security microservice, to name a few to receive and process network traffic. Frequently, a new microservice is deployed, either to provide a new security service, or to provide another instance of a microservice in order to alleviate the load on an existing microservice. One challenge in managing data flow in such a datacenter is to select a virtual machine or server on which to instantiate a new microservice. Unfortunately, deploying a microservice within a security services deployment may exhibit a number of limitations. These limitations can be grouped into the general categories of insufficient loading knowledge, poor temporal response and poor accuracy. General solutions limited to processing load and memory load are generally unable to use the anticipated requirements of the new microservice to select the most suitable virtual machine or server.

Detailed herein are embodiments of datacenter network security detection and protection that allow for configuration, scaling out or in according to traffic load, and deploying microservices. At least one datacenter is to act as a host machine to provide computing capacity to host at least one virtual machine acting as a guest machine, which in turn provides a computing environment to execute at least one security microservice. In some embodiments, the security microservices are stateless and can communicate with other microservices via a backplane. As traffic increases or as new types of security microservices are to be provided, embodiments disclosed herein receive requests to instantiate new microservices. According to embodiments disclosed herein, a new instance of a microservice is deployed on a suitable virtual machine selected from one or more virtual machines hosted on one or more servers. New microservices are deployed either on an existing virtual machine or a newly-instantiated virtual machine. An advantage of some embodiments is that the selection of a virtual machine includes calculating the suitability of the virtual machine based on a server property value and a server property weight. By selecting the most suitable virtual machine rather than the least loaded virtual machine, new microservices can more efficiently utilize available resources. Another advantage of embodiments disclosed herein is that the new microservices are not only instantiated in a virtual environment, but are also coupled to an interface microservice to capture network traffic from a physical server. Yet another advantage of some embodiments is that a microservice can be agnostic to the virtualization environment in which it is deployed.

Hierarchy of Security Microservices in a Security Service Hardware Platform

FIG. 1 is a block diagram illustrating an embodiment of components of a scalable microservice architecture using microservices. For example, this may illustrate a server. Network security system microservices are stored in memory (e.g., volatile memory such as Random Access Memory (RAM) and/or non-volatile memory such as disk) and executed by one or more hardware processors or processor cores. Network security system microservices, consisting of computer-executable instructions to perform a specific security service, are deployed based on configuration across available physical servers. Typically, each microservice receives configuration and tasks via a backplane of a virtual chassis 106 and returns status, statistics and other information to the backplane. A common property of a microservice is the separation and protection of memory from other microservices. In this manner, an individual microservice may be moved to another physical server or terminate abnormally without impacting other microservices.

The data processed by the security system is transferred from a microservice to another (higher hierarchy) microservice using a data plane. In some embodiments, during such a transfer, the lower microservice makes a decision (based on configuration, current statistics and other information) as to which higher-hierarchy microservice to utilize. Such a decision may constitute a load-balancing decision to assure that the higher-hierarchy microservices are efficiently utilized. In other embodiments, the decision of which microservice to utilize is made by a more central entity.

As illustrated, network security system utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices store in memory 104 (e.g., volatile memory such as Random Access Memory (RAM) and/or non-volatile memory such as disk). A network interface 124 (e.g., fabric or interconnect that is wired or wireless) provides a means for communicating with a data center. Network security system may inspect traffic, detect threats, and otherwise protects a data center, as further described below, using microservices.

Embodiments of a network security system providing the above capabilities are now discussed in more detail. Network security system adds security to, or enhances the security of, a datacenter. In an embodiment, network security system is delivered in the form of a seed software application (e.g., downloaded). The seed software application instantiates microservices of the network security system on a host in the datacenter. As used herein a microservice container refers to where the microservice runs, most prominently a virtual machine. Once deployed, network security system utilizes a hardware processor 102 (as detailed above), memory 104, and network interface 12. In many scenarios, security may be added/configured using existing hardware and/or without having to purchase specific rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

Once initiated, as also further described below, network security system, in some embodiments, will utilize network interface 124 to explore the datacenter to discover what network segments exist, the security requirements of various network segments, what hosts and hardware resources are available, and additional configuration information as needed. In an embodiment, the datacenter itself includes several machines with hypervisors, or physical hardware, and the network security system 100 offers microservices to communicate with and protect one or more of those internal virtual machines or physical hardware. After performing datacenter discovery, network security system will, in some embodiments, then offer or suggest available security tools to be selected either through a user interface, or by connections with existing enterprise management software. In one embodiment, once configured, network security system is deployed "in-line," receiving substantially all of the packets headed for the datacenter, allowing network security system to intercept and block suspicious traffic before it the datacenter. With an understanding of the datacenter, network security system 100 deploys microservices to inspect traffic throughout the datacenter, not just at the ingress. In some embodiments, network security system is deployed in a "copy only" configuration, in which it monitors traffic, detects threats, and generates alerts, but does not intercept traffic before it arrives at the datacenter.

Referring again to FIG. 1, though not shown, hardware processor 102 in one embodiment includes one or more levels of cache memory. As shown, memory 104 has stored therein microservices 108, 110, 112, 114, 116, 118, 120, and 122, as well as virtual chassis 106, which is itself a microservice. In an embodiment, the microservices are small in size, consisting of a relatively small number of instructions. In an embodiment, the microservices are independent of each other. As illustrated, microservices 108-122 are microservices that are loaded from memory and executed by the hardware processor 102. Those microservices include datapath security microservices, for example TCP/IP, SSL, DPI, or DPL inspection microservices, as described further below with respect to FIG. 2 and FIG. 3. The microservices may also include management microservices, for example a chassis controller to manage the microservices, a configuration microservice, an infrastructure discovery microservice, a database microservice to store data, and a policy update microservice to receive policy updates from an external security cloud, and a compiler to receive policy data from various sources and to produce binary policy outputs to be used by the microservices, to name a few examples that are described further below with respect to FIG. 2 and FIG. 3.

Network security system receives traffic via network interface 124 to/from s datacenter. In one embodiment, network security system is placed in-line to inspect traffic, and potentially intercept a threat before it arrives at, or leaves, the datacenter. In alternate embodiments, network security system monitors the traffic heading into, or out of, the datacenter, in which case the network security system detects threats and generates alerts, but does not block the data. Hardware processor 102 then executes various data security microservices on the data. For example, as will be described further below with respect to FIG. 2 and FIG. 3, typically traffic first passes into and through a segment microservice, then a TCP/IP inspection microservice, then an SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Datapath microservices as used herein refer to various microservices that inspect and analyze network traffic, such as TCP, TLS, DPI, NOX, or DLP. TCP microservice, for example, refers to a packet handling microservice able to process any layer 4-6 network packet and includes part of Firewalling. TLS microservice, for example, refers to Transport Layer Security microservice, which decrypts/re-encrypts connections. DPI microservice, for example, refers to Deep Packet Inspection microservice and handles layer 7 inspection. NOX microservice, for example, refers to Network Object Extractor microservice, and works in conjunction with DPI to assemble objects from individual packets and deliver them to other services. DLP microservice, for example, refers to Data Loss Prevention microservice, which detects and prevents data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices will, in one embodiment, be reported to a chassis controller microservice, which takes remedial action.

In an embodiment, microservices 108-122 are implemented using computer-executable instructions loaded from the Internet, via network interface 124. For instance, in an embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer readable medium, such as digital media, including another disc drive, a CD, a CDROM, a DVD, a USB flash drives, a Flash memory, a Secure Digital (SD) memory card, a memory card, without limitation. Microservices received from a digital medium in one instance are stored into memory 104. The embodiments are not limited in this context. In further embodiments, a digital medium is a data source that constitutes a combination of hardware elements such as a processor and memory.

In most embodiments, network security system runs on a datacenter computer. In alternate embodiments, however, network security system is installed and runs on any one of a wide variety of alternate computing platforms, ranging from low-cost to high-cost, and from low-power to high power. In some embodiments, network security system is installed on and runs on a low-cost, commodity server computer, or, in some embodiments, on a low-cost rack-mounted server. As illustrated, hardware processor 102 is a single core processor. In alternate embodiments, hardware processor 102 is a multi-core processor. In alternate embodiments, hardware processor 102 is a massively parallel processor.

In some embodiments, virtual chassis 106 and microservices 108-122 may be hosted on any of a wide variety of hardware platforms used in the datacenter to be protected. Table 1, below, lists and describes a number of exemplary datacenter environments, any one of which hosts virtual chassis 106 and microservices 108-122:

TABLE 1

Environments for hosting virtual chassis 106

| Environment | Description |
|---|---|
| Bare Metal | This environment is associated with the North/South Use Case. Network security system microservices will be hosted on ESX hypervisors and physical hosts upon which the FE microservices reside will be connected to the physical network where required. There will be no orchestration/integration touch point for this environment. |
| ESX | This environment is associated with the East/West Use Case. Network security system microservices will be hosted on ESX hypervisors. The orchestration/integration touch point will be vCenter. |
| NSX | This environment is associated with the East/West Use Case. Network security system microservices will be hosted on ESX hypervisors. The orchestration/integration touch point will be NSX Controller. |
| OpenStack | This environment is associated with the East/West Use Case. Network security system microservices will be hosted on KVM hypervisors. The orchestration/integration touch point remains to be determined. Because of the fragmented nature of the OpenStack market, the Network security system) will be developed and tested to a single choice of version, distribution and network controller and will then be customized on a customer-by-customer basis. |
| AWS | This environment is associated with the Public Cloud Use Case. Network security system microservices will be hosted as AWS instances. The orchestration/integration touch point will be AWS Config/AWS OpsWorks. |
| Microsoft Azure | This environment is associated with the Public Cloud Use Case. Network security system) microservices will be hosted as Azure Virtual Machines. The orchestration/integration touch point will be Azure Automation and Runbooks. |

In some examples, network security system scales out using available resources to accommodate higher traffic or load. In an exemplary embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which they are needed while not allocating additional CPUs and memory to those portions of the security hierarchy that can accommodate the higher traffic utilizing their existing allocation.

A common property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of the operating system on which they were spawned.

Dynamically Scalable Security Microservices

FIG. 2 illustrates a three-time scale out, according to an embodiment, using microservices. In this example, only a single microservice (DPI) would benefit from additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each layer of the security service hierarchy is scaled and configured independently to load balance the supply of processed data to the next hierarchy level. As shown, datacenter 216 includes datacenter rack 218, which includes physical server A, 220, physical server B, 222, and physical server C, 224. As shown, datacenter rack 226 includes physical server X 228, physical server Y, 230 and physical server Z 232. DPI microservices 208 have been scaled out 3×, and in this instance assigned to be performed as microservices 4-to-6 on physical server B 222 and physical server C 224. The remaining microservices of scalable security architecture are shown as being implemented by physical servers A, X, Y, and Z, 220, 228, 230, and 232. A configuration microservice 202 creates a configuration backplane and a data plane deployed as a software component on each physical server that is to receive security services. This creating process takes the form of configuring routing rules, reserving network address space (such as a subnet) and configuring virtual environments to utilize portions of the reserved address space as gateways for network communication in and out of the servers to be secured. Both the backplane and data plane may thus be considered virtual networks managed by the security system. All security microservices may then utilize these networks to transmit packets, content, state and other information among themselves. The properties of the backplane and data plane are configured to reject packet traffic from outside the security system and route information between microservices regardless of the physical server and virtual environment configuration.

FIG. 3 illustrates an arbitrary scale-out according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316, provisions microservices 318, 320, 322, 324, 326, and 328. the 11 microservices from a lowest hierarchy to a highest hierarchy, and configures them to communicate with each other via a backplane. The microservices are implemented by physical servers in datacenter 330.

Deploying a Security Service

Figure 4:
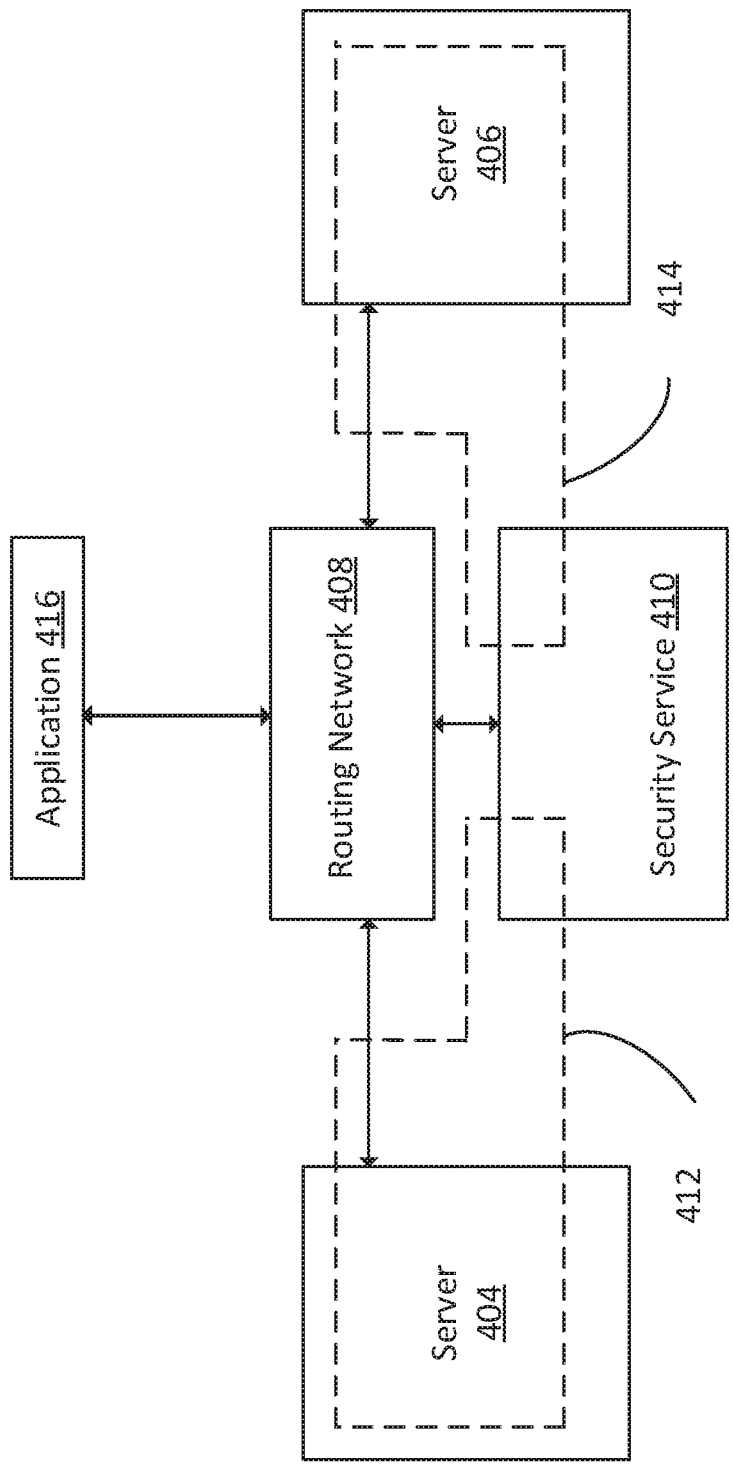
FIG. 4 is a block diagram illustrating a security service to monitor traffic between an Application and one or more servers through a routing network according to an embodiment.

FIG. 4 is a system level block diagram according to an embodiment. One or more security services 410 monitor traffic between an application 416 and one or more servers 404 and 406 through a routing network 408 according to an embodiment. The security service 410 is a group of microservices that used to secure traffic from/to the application 416 and the servers 404 and 406. These microservices do not need to be confined to one physical server such as server 404 or server 406. For example, one or more microservices of the security service 410 may be executed on server 404 and other microservices of the security service 410 are executed on server 406. In some embodiments, the security service 410 is executed on a server that it is not protecting.

Routing network 408 provides connectivity among server 404, server 406, security service 410, and application 416, and may support encapsulation protocols employed by embodiments disclosed herein. In some embodiments, routing network 408 is partially configured responsive to hypervisor configuration of servers 404 and 406.

By virtue of routing information included in channel data encapsulation packets, as explained further below, data traveling between an application 416 and server 404 and/or server 406 is routed to the correct server, and is kept separate from data traveling between the application 416 and the other server. Accordingly, what is essentially a private network 412 is created between the server running security service 410 and server 404. Similarly, what is essentially a private network 414 is created between the server running security service 410 and server 406.

Figure 5:
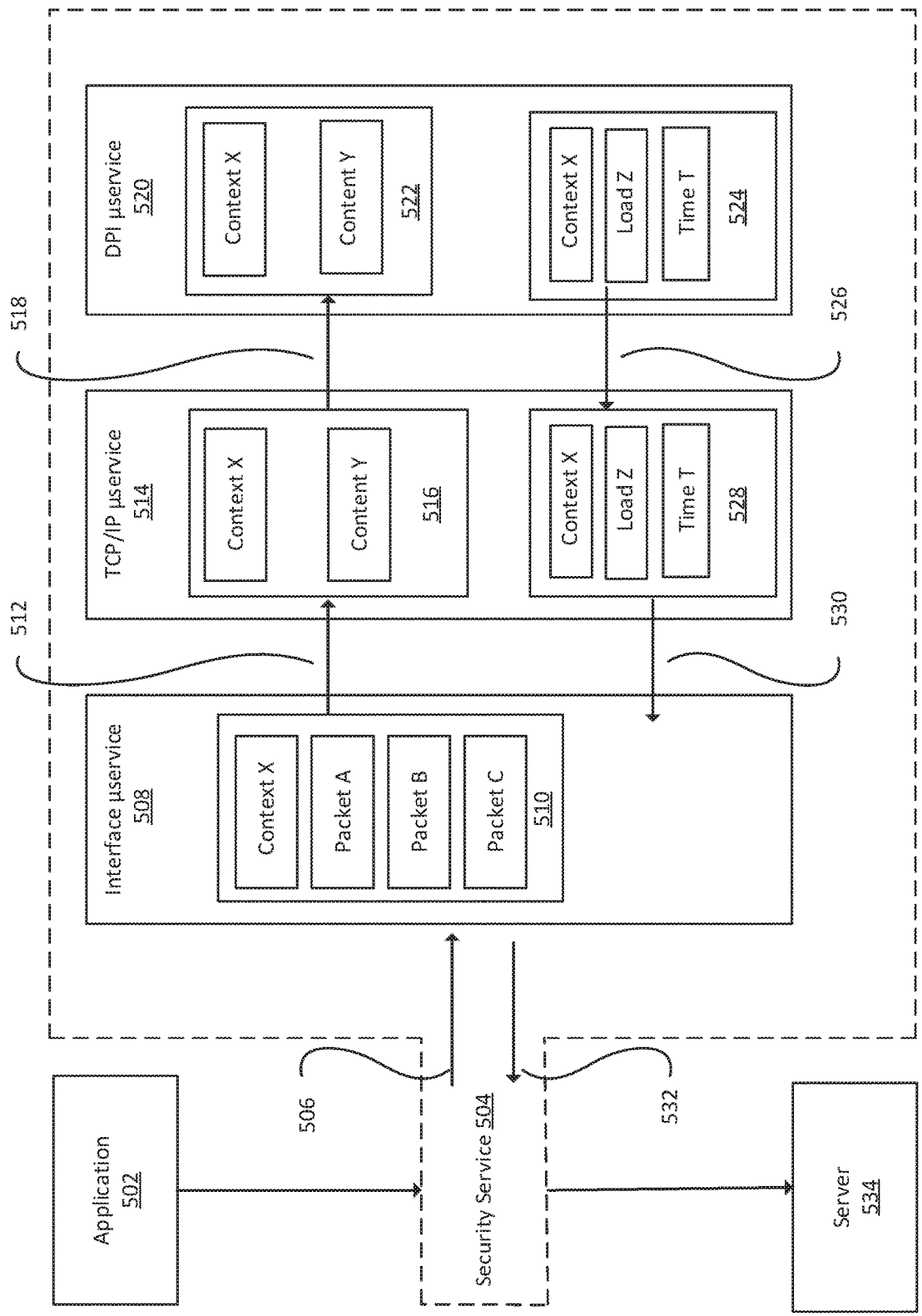
FIG. 5 is a block flow diagram illustrating application data traversing to a server after passing through a hierarchy of a security microservices according to an embodiment.

Application Data Traversing Among Security Microservices of a Hierarchical Security Service FIG. 5 is a block flow diagram illustrating application data traversing to a server after passing through a hierarchy of a security microservices according to an embodiment. As illustrated, the flow begins with security service 504 receiving a network data packet from application 502. Security service 504 forwards 506 the packet to interface microservice 508, which generates a channel data encapsulation packet 510, which encapsulates three packets A, B, and C, and context X. As shown, channel data encapsulation packet 510 encapsulates three packets, but in alternate embodiments, the number of encapsulated packets may vary, without limitation. In some embodiments, context X is generated based at least on the headers of packets A, B and C. In some embodiments, context X is generated through a lookup of packet header fields such as IP addresses, ports and mac addresses for the source and/or destination of the packets. In some embodiments, the generation of context X includes utilizing an interface identifier obtained from a virtualization environment. Generation of context X may be accomplished through a lookup of header fields and other data in a table or data structure, a hash of header fields and other data or another method whereby packets for which a common security policy is to be applied will have a common context or common portion, such as a bit field, of the context.

Context X may be considered an identifier describing the traffic streams, source machines or applications responsible for generating packets A, B and C. This identifier may be direct (such as an ID used as a table look up), indirect (such as a pointer used to access a data structure) or some other method of instructing microservices as to the policies and processing to use for handling packets A, B and C. As an example, context X may be generated by performing a hash, longest prefix match or lookup of header fields such as IP addresses, TCP Ports, Interface Names (or MAC Addresses) or other packet properties. The lookup may be an exact match, longest prefix match or other method to associate packet streams with the same security processing to use. The generated context may then be used by security services, such as a DPI service, to determine which rules should be utilized when scanning the data from packets A, B and C (and other packets that are part of the same traffic stream). This information may be embedded within the context (as a bit field or other information), available by indirection (such as a table or data structure lookup by another service) or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) that will only rarely use stateful updates.

Interface microservice 508 transmits 512 the channel data encapsulation packet 510 to TCP/IP microservice 514. As shown the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 it to DPI microservice 520. As shown the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 24, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, DPI microservice 520 transmits, via path 526, channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCPI/IP load Z, and TCP/IP Timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP Timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534.µservice The benefits of the security service 504 include the ability of each microservice to utilize the same channel data encapsulation protocol for all communication, thereby allowing scaling across the entirety of the datacenter network routable via the channel data encapsulation header. Communications between microservices maintain Context X generated at Interface microservice 508 to all subsequent microservices that no longer have access to the original packets. By providing load and timestamp data in the channel data encapsulation packets 524 and 528, which are returned via paths 526 and 530, the microservices receive and can maintain real-time loading and processing latency information utilized to make load balancing decisions.

Figure 6:
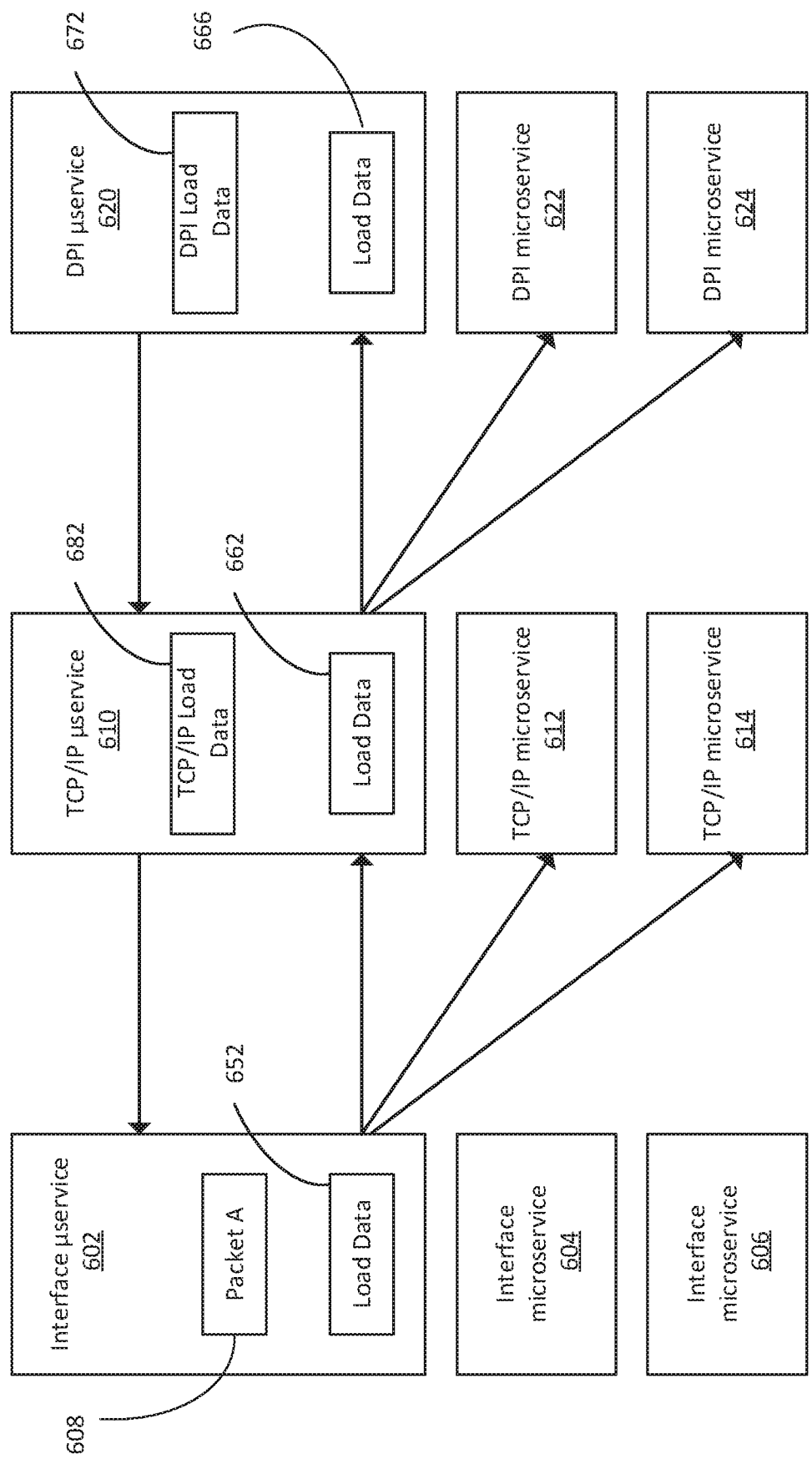
FIG. 6 is a block flow diagram illustrating application data flowing between an interface microservice and a plurality of TCP/IP Microservices and DPI microservices according to an embodiment.

Deploying Security Microservices within a Dynamically Extensible Security Service FIG. 6 is a block flow diagram illustrating application data flowing between an interface microservice and a plurality of TCP/IP Microservices and DPI microservices according to an embodiment. Each of the security microservices at the levels of the hierarchy generate their own security load by measuring, scaling, and weighing properties that reflect operating parameters that are relevant to the security processing they are doing.

As an example, a microservice may be configured to only consider CPU and memory utilization in its load calculation and consider them equally. CPU load (per virtual CPU core) may be expressed as a value in the range of 0-100 wherein 0 represents an idle CPU and 100 represents a fully utilized CPU with no idle cycles. Memory utilization may be calculated by the application based on how much memory it is consuming (or as a percentage of a maximum allocated or available quantity). As a further example, the system administrator may determine that the particular microservice should not consume more than half the system memory of 16 GB causing a utilization of 8 GB to be considered as a 100% memory utilization.

To achieve a desired configuration, a microservice periodically obtains the CPU and memory measurements from one or more of: the operating system, the hypervisor, or its own counters and statistics. In some embodiments, the CPU measurement is a number from 0 to 100 and the memory is a number from 0 to system memory size (e.g., 16 GB). In some embodiments, the range of measurement is programmable. For measurement values not normally expressed in a range of 0 to 100, 0 to 1 or some other normalized range, a scaling value may be used to convert the raw value to the normalized range through a multiplication operation, table lookup or other operation. CPU scaling may be programmed to "1" reflecting that it is already scaled from 0 to 100 (a multiplication by 1 will maintain the measurement range of 0 to 100). The memory scaling may be programmed to the quantity 100 divided by 8 GB, such that when 8 GB (half the system memory as desired) is utilized, the scaled memory measurement will be 100. To combine these measurements equally, each measurement is weighted by 0.5 such that when added, the loading produced is still in the range 0 to 100. In such a combination, the CPU utilization measurement and memory utilization measurement contribute equally to the overall utilization of the microservice.

As illustrated, interface microservice 602 receives packet A 608, which, in some embodiments comprises a header and data. Interface microservice 604 and interface microservice 606 are to operate similarly when they receive packets. The header may contain routing and protocol information while the data may be part of a traffic stream transported over the network. Interface microservice 602 then accesses load data 652 to conduct a load balancing to select a TCP/IP microservice to receive the packet. In some embodiments, load data 652 is a table. In some embodiments, the microservices communicate using an IP network such that data transmitted by a sender results in a response delivered to the same sender through communication over a socket. In some embodiments, the transmitter of information is identified through information present in each transmission.

Interface microservice 602 transmits packet A 608 to the selected TCP/IP microservice, here 610, though TCP/IP microservice 612 or TCP/IP microservice 614 could have been selected. Packet A may be transmitted by a number of methods such as encapsulating Packet A in another protocol, transmitting a plurality of packets, including Packet A, within one larger packet with some encapsulation or header, or other means of transmitting the contents of Packet A to the TCP/IP microservice. After conducting TCP/IP processing on packet A, TCP/IP microservice accesses its load data 662 to conduct a load balancing to select a DPI microservice to receive its output. At 660, TCP/IP microservice 610 transmits its output to the selected DPI microservice, here 620, though DPI microservice 622 or DPI microservice 624 could have been selected. Though not shown, it should be understood that DPI microservice 620 itself accesses its load data 666 to select the next microservice to which to transmit its output.

TCP/IP microservice 610 generates its own service load and provides it to the interface microservice 602, which is at a lower level of the hierarchy of security microservices. Interface microservice 602, in turn, stores the service load in its load data 652, to be accessed to inform future load balancing TCP/IP microservice selections. In some embodiments, a context, e.g., as described in FIG. 5, is used to restrict the selection of TCP/IP microservice. In some embodiments, the restriction consists of a specification of a subset of TCP/IP microservices, a priority applied to a subset of TCP/IP microservices or other means of concentrating work to be performed for packets of a specific context within a subset of the available TCP/IP microservices. In some embodiments, all TCP/IP microservices process any packets received from interface microservice 602 or any other interface microservice. In other embodiments, only TCP/IP microservices on the same physical server as interface microservice 602 are present within the load data.

Similarly, DPI microservice 620 generates its own service load in its TCP/IP load data 682 and provides it to the TCP/IP microservice 610. In some embodiments, this includes the service load information of DPI microservice 620. In some embodiments, 620 updates its service load to DPI load data 672, a common memory that is accessed by TCP/IP Microservice 610 and other TCP/IP microservices. In some embodiments, TCP/IP Microservices 610, 612 and 614 periodically receive response messages from each of DPI Microservices 620, 622 and 624 containing the respective service loads regardless of whether that have received transmissions from the TCP/IP microservices, which is at a lower level of the hierarchy of security microservices. TCP/IP microservice 610, in turn, stores the service load in load data 662, to be accessed to inform future load balancing DPI microservice selections. In some embodiments, load data 662 is a table. Each microservice provides its loading data to the plurality of lower-hierarchy microservices that send work to be performed as part of the response transmission. In one embodiment, a configuration populates initial entries into the load table to indicate that the current loading of available higher-hierarchy microservices is zero. In one embodiment, the service load is included in a response packet to the lower-hierarchy service. Not shown in this illustration, is that in some embodiments load information is transmitted to all microservices in the immediately preceding level.

In some embodiments, a load metric generated by each microservice, and sent as part of every response to a lower-level microservice, is programmatically configured to more accurately reflect the aspects of performance that are relevant to the processing performed by the particular microservice. As an example, a microservice performing logging services is primarily concerned with disk activity and capacity. Each property (such as CPU utilization, memory utilization, disk capacity, disk throughput, IO throughput, work or event throughput or other metric, etc.) is first scaled to normalize all properties to a uniform range (such as 0 to 1, 0 to 100, or other range) and then weighted to reflect the relative importance of each property for the physical and virtual environment within which the microservice is executing. To generate service load, a microservice (or microservice) uses a load generator and a configuration.

Figure 7:
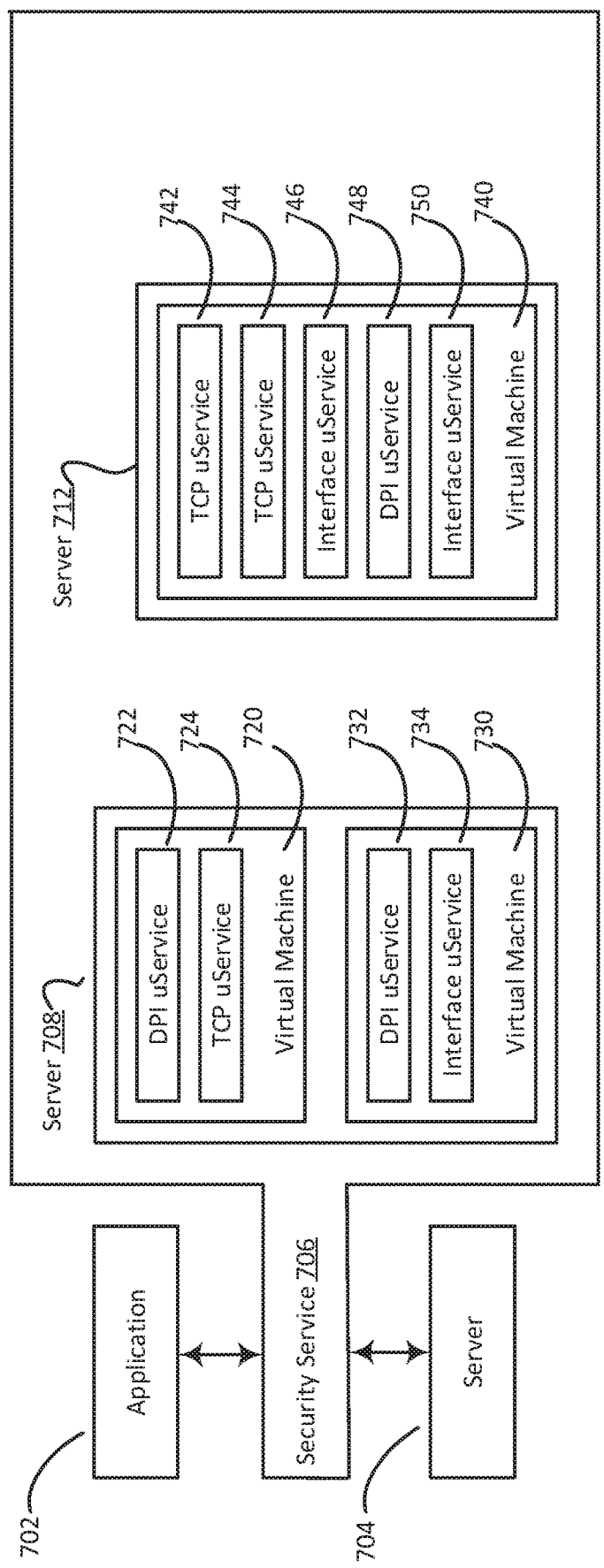
FIG. 7 is a security service block diagram illustrating security microservices deployed on virtual machines hosted by servers according to an embodiment.

FIG. 7 is a security service block diagram illustrating security microservices deployed on virtual machines hosted by servers according to an embodiment. As shown, security service 706 is disposed between and monitors network traffic flowing from application 702 to server 704. Security service 706 is also configured to monitor traffic flowing from server 704 to application 702. Security service 706 includes server 708, which hosts virtual machine 720, on which DPI microservice 722 and TCP microservice 724 are deployed, and virtual machine 730, on which DPI microservice 732 and interface microservice 734 are deployed. (Components of the servers such as processors and storage are not shown.) Security service 706 also includes server 712, which hosts virtual machine 740, on which TCP microservice 742, TCP microservice 744, interface microservice 746, DPI microservice 748, and interface microservice 750, are deployed, and virtual machine 730, on which DPI microservice 732 and interface microservice 734 are deployed.

DPI microservices 722, 732, and 748, and TCP microservices 724, 742, and 744 each utilize one or more of interface microservices 734, 746, and 750 to capture network traffic. In some embodiments, more than one of interface microservices 734, 746, and 750 can be used by any of the TCP and DPI microservices. In some embodiments, DPI microservice 722 uses a different interface microservice than DPI microservice 732. In other words, security microservices can choose which interface microservice to use. In some embodiments, an interface microservice running on a computing platform other than server 708 or server 712 is used. Such an external interface service can be shared by microservices running on server 708 and server 712.

Servers 708 and 712 can run on any suitable computing platform, without limitation. In some embodiments, servers 708 and 712 each run on a different hardware platform, such as a server rack or a blade, or a standalone computer. In some embodiments, virtual machines 720, 730, and 740, as well as microservices 722, 724, 732, 734, 742, 744, 746, 748, and 750 store data in memory to be processed by the hardware platform. In alternate embodiments, servers 708 and 712 run on the same hardware. In alternate embodiments, servers 708 and 712 run on different cores of a multiprocessor computer or server. In some embodiments, security microservices can have their own stacks, so as to not comingle their data with other security microservices. For example, a first set of processor general purpose registers can be dedicated for use as a first microservice's stack, while a second set of processor general purpose registers can be dedicated for use as a second microservice's stack. In some embodiments, servers 708 and 712 run on blades sharing the same housing. In alternate embodiments, servers 708 and 712 are geographically separated.

Exemplary security service 706 is shown providing three virtual machines on which nine security microservices are deployed, but can support many more servers, virtual machines, and microservices, without limitation. For example, security service 706 can include tens or hundreds or even thousands of servers. Similarly, although virtual machine 720, virtual machine 730, and virtual machine 740 are shown having nine microservices deployed on them, each virtual machine can allow deployment of more or fewer microservices, without limitation.

Selecting a Suitable Environment to Deploy a Microservice

A request may be received to instantiate a new security microservice and deploy it within a security service (such as security service 706). The new security microservice may be a new instance of a security microservice already deployed within a security service, or it may be a type of security microservice being deployed for the first time.

Embodiments disclosed herein describe how to select a suitable location or processing environment in which to deploy the new microservice. The selection includes selecting a server on which to deploy. In some embodiments, the selection includes selecting a virtual machine on which to instantiate the new microservice.

In some embodiments, the new microservice is deployed on a virtual machine that does not already provide that microservice. For example, deploying a new interface microservice on virtual machine 720, which does not already have an interface microservice. In other embodiments, the new microservice is deployed on a virtual machine that already has an instance of that microservice. For example, deploying a new interface microservice on virtual machine 740, which already has an interface microservice. In other embodiments, the new microservice is deployed on a server that already provides that type of microservice, but a new instance of that microservice is to be deployed. For example, a new DPI service may be deployed on virtual machine 730, which already includes a DPI microservice 732.

Selecting a processing environment on which to deploy the new microservice may involve simply identifying the least-loaded server or microservice. Some embodiments disclosed herein, however, evaluate more. Embodiments disclosed herein analyze multiple server properties and virtual machine properties in order to select a processing environment suited to the new microservice. Embodiments disclosed herein take into consideration the extent to which a server is loaded with respect to a particular microservice. Embodiments disclosed herein take into consideration various properties or statistics that are relevant to the new microservice being added. For example, a new microservice that is expected to use lots of disk accesses will weigh disk access highly. In some embodiments, selecting a suitable processing environment where to deploy a new microservice involves analyzing many properties, each weighted to represent its significance.

Virtual Machine Load Profile and Service Load Profile

As detailed above, in some embodiments, selecting a suitable processing environment on which to deploy a new microservice involves analyzing many properties, each weighted to represent its significance. The load metrics are stored in a properties data structure, an embodiment of which is illustrated in FIG. 8.

Figure 8:
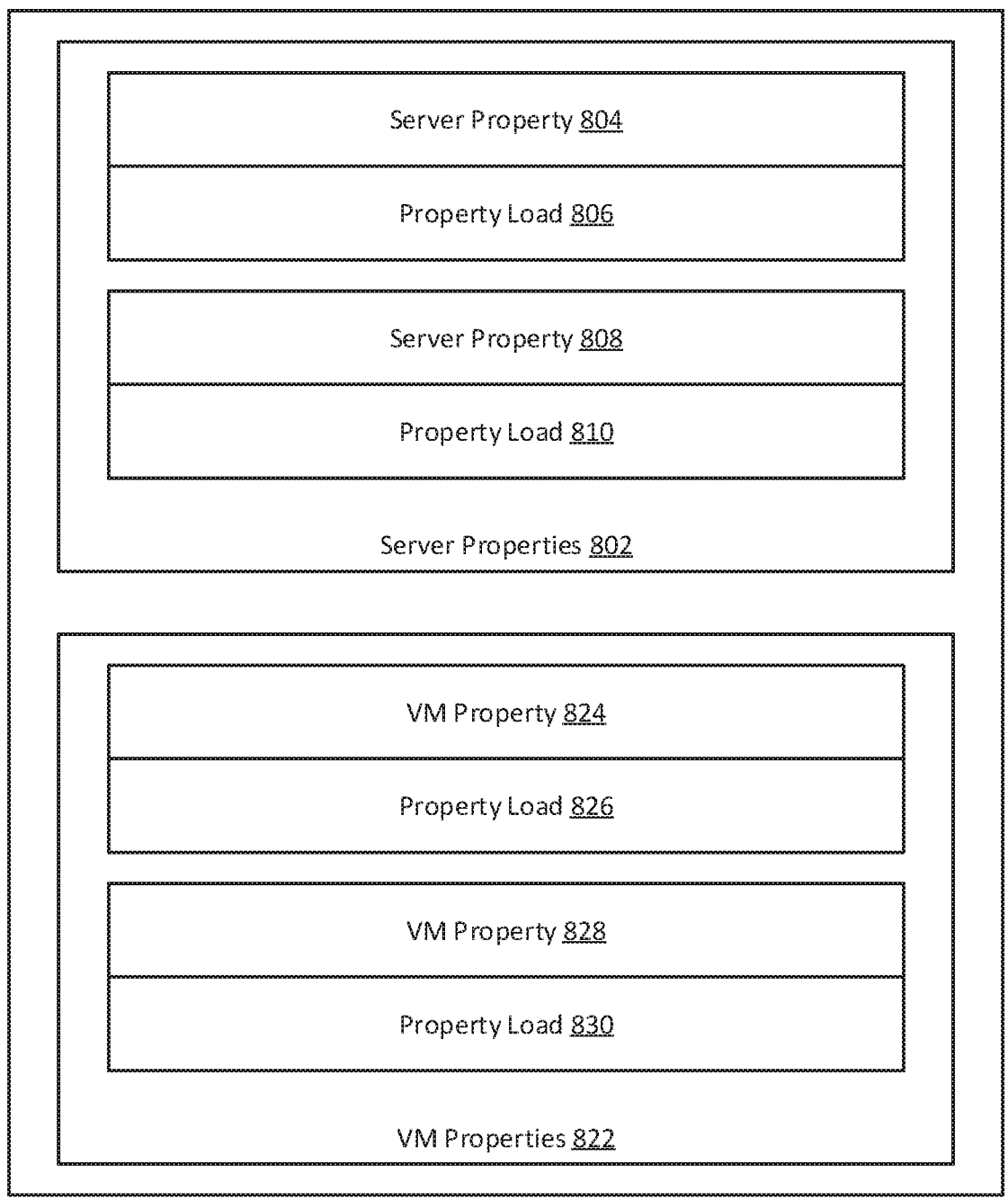
FIG. 8 is an embodiment of a virtual machine load profile.

FIG. 8 is an embodiment of a virtual machine load profile. As illustrated, the properties data structure stores server properties 802, which include two pairs of properties: server property 804 and property load 806, and server property 808 and property load 810. In some embodiments, the properties data structure is a table. Examples of server properties include physical memory usage, utilization of the physical CPU cores and I/O utilization (such as network or storage utilization) of the server interface cards (host bus adapters). Examples of VM properties include those same properties as seen by each virtual machine. As an example, a physical server with 32 CPU cores and 128 GB of memory may comprise a virtual machine with 8 CPU cores and 16 GB of memory wherein those virtual cores do not correspond directly (1:1) with a physical core and the 16 GB of virtual machine memory is thinly provisioned from the physical server's 128 GB of memory. The virtual server may be heavily utilized while the physical server in which it executes is lightly utilized. The pairs of properties within Server Properties 802 are sometimes referred to as a server load.

As illustrated, the VM load profile also stores VM properties 822, which include two pairs of properties and their respective loads: VM property 824 and property load 826, and VM property 828 and property load 830. The pairs of values within VM properties 822, are sometimes referred to herein as VM load.

The pairs of values consisting of a property and a load are sometimes referred to herein as load properties, which is applicable to both server properties 802 and VM properties 822.

In some embodiments, as described below, the VM load profile data is parsed to identify a suitable virtual machine on which to deploy the new microservice.

Figure 9:
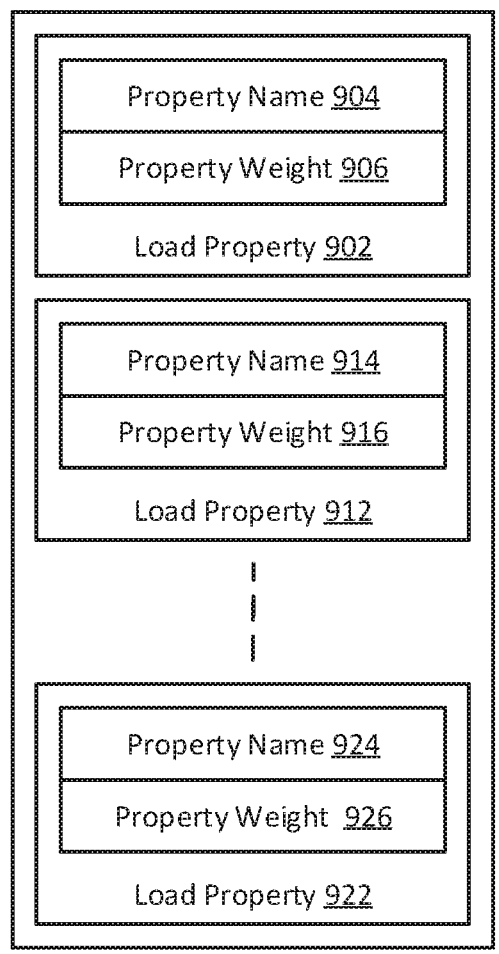
FIG. 9 is an embodiment of a service load profile.

FIG. 9 is an embodiment of a service load profile. In some embodiments, the service load profile is a data structure, maintained within a configuration microservice, that includes one or more load properties, each of which includes a pair of values: a property name and a corresponding property weight. In some embodiments, the service load profile data is a table. Examples of properties include the memory usage, utilization of CPU cores and I/O utilization (such as network or storage utilization) of the server interface cards (host bus adapters). The pair of values is sometimes referred to herein as a load property. In some embodiments, the property names of a service load profile correspond to a server property or a VM property. Here, load property 902 includes property name 904 and corresponding property weight 906, load property 912 includes property name 914 and corresponding property weight 916, and load property 922 includes property name 924 and corresponding property weight 926. In some embodiments, an equivalence between a property name (from FIG. 9) within a service load profile and a VM load profile (from FIG. 8) is utilized in a calculation such that the corresponding property weight within the service load profile influences the relative importance of the corresponding property name. For example, if property name 904 and VM property 824 are both "Available Bulk Storage", then corresponding property weight 906 may be used to influence the relative weighting of the currently available bulk storage (826) in the determination of whether a particular virtual machine (characterized by its VM load profile) is the most suitable for deployment of a new microservice. If corresponding property weight 906 is set to zero, the currently available bulk storage is not considered for each potential existing virtual machine.

In operation, the property weight of the service load profile and the property load from the VM load profile are multiplied, and the property weight is used to reflect the relative importance of the property name in the selection of an operating environment for a new microservice. Similarly, the property weight can be used to remove the influence of a property (by setting the weight to zero) or to make the property the sole influencing factor (by setting all other weights to zero).

Figure 10:
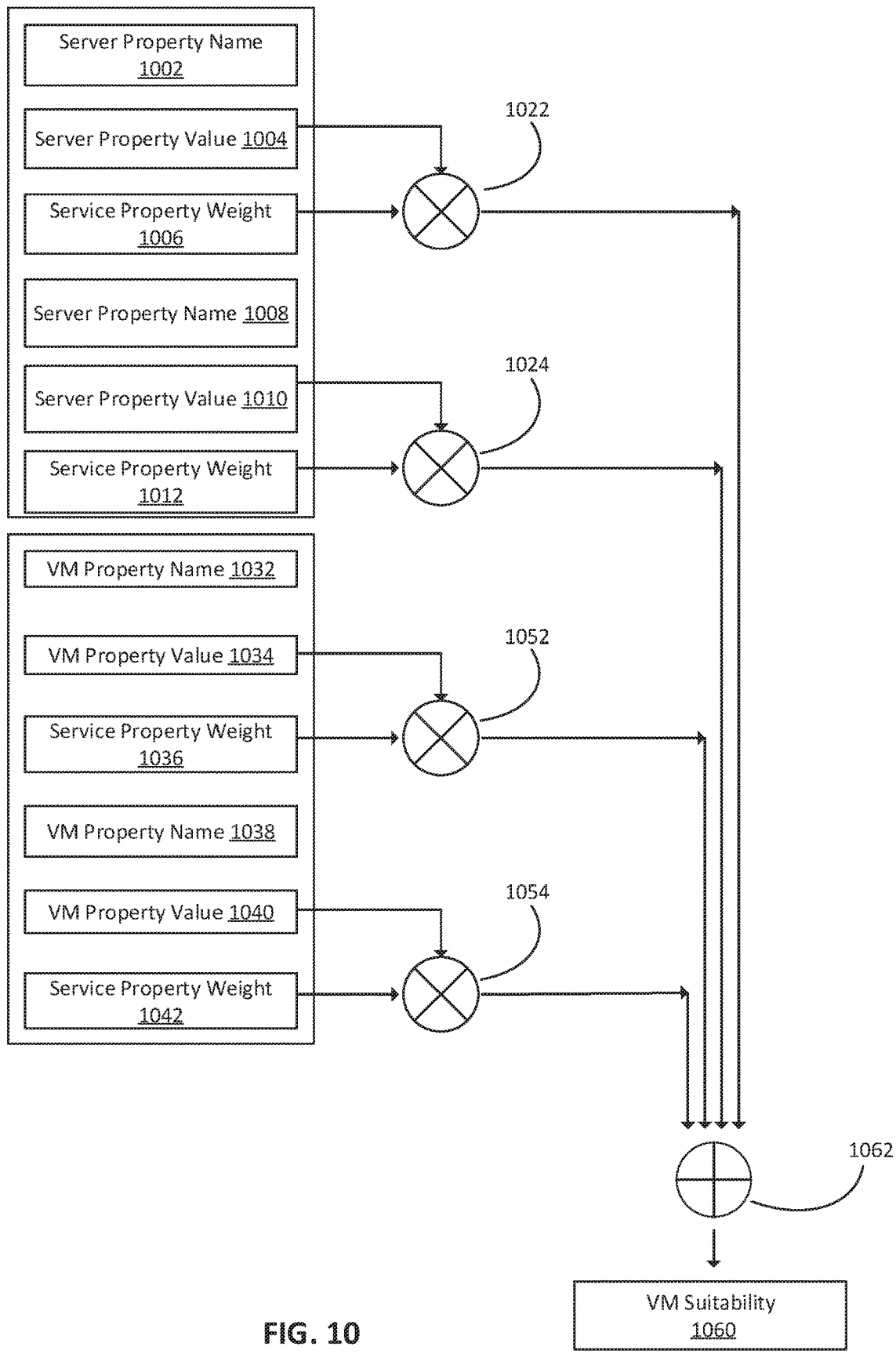
FIG. 10 is a flow diagram illustrating a virtual machine suitability evaluation according to an embodiment.

FIG. 10 is a flow diagram illustrating a virtual machine suitability evaluation, performed by a configuration microservice upon request or in response to determining that a particular VM is overloaded, according to an embodiment. As shown, suitability is calculated by multiplying each relevant service property value (corresponding to the server property load 806 from FIG. 8) and VM property value (corresponding to the VM property load 826 of FIG. 8) by their corresponding property weights (respective property weights from FIG. 9), then summing them. In particular, as shown, VM suitability 1060 is the sum produced by adder 1062, which is shown adding four quantities: 1) the output of multiplier 1022, which multiplies server property value 1004 by corresponding service property weight 1006, both of which are associated with server property (as denoted by server property name 1002 and corresponding to the property names of FIG. 9), 2) the output of multiplier 1024, which multiplies server property value 1010 by corresponding service property weight 1012, both of which are associated with server property name 1008, 3) the output of multiplier 1052, which multiplies VM property value 1034 by corresponding service property weight 1036, both of which are associated with VM property name 1032, and 4) the output of multiplier 1054, which multiplies VM property value 1040 by corresponding service property weight 1042, both of which are associated with VM property name 1038.

Figure 11:
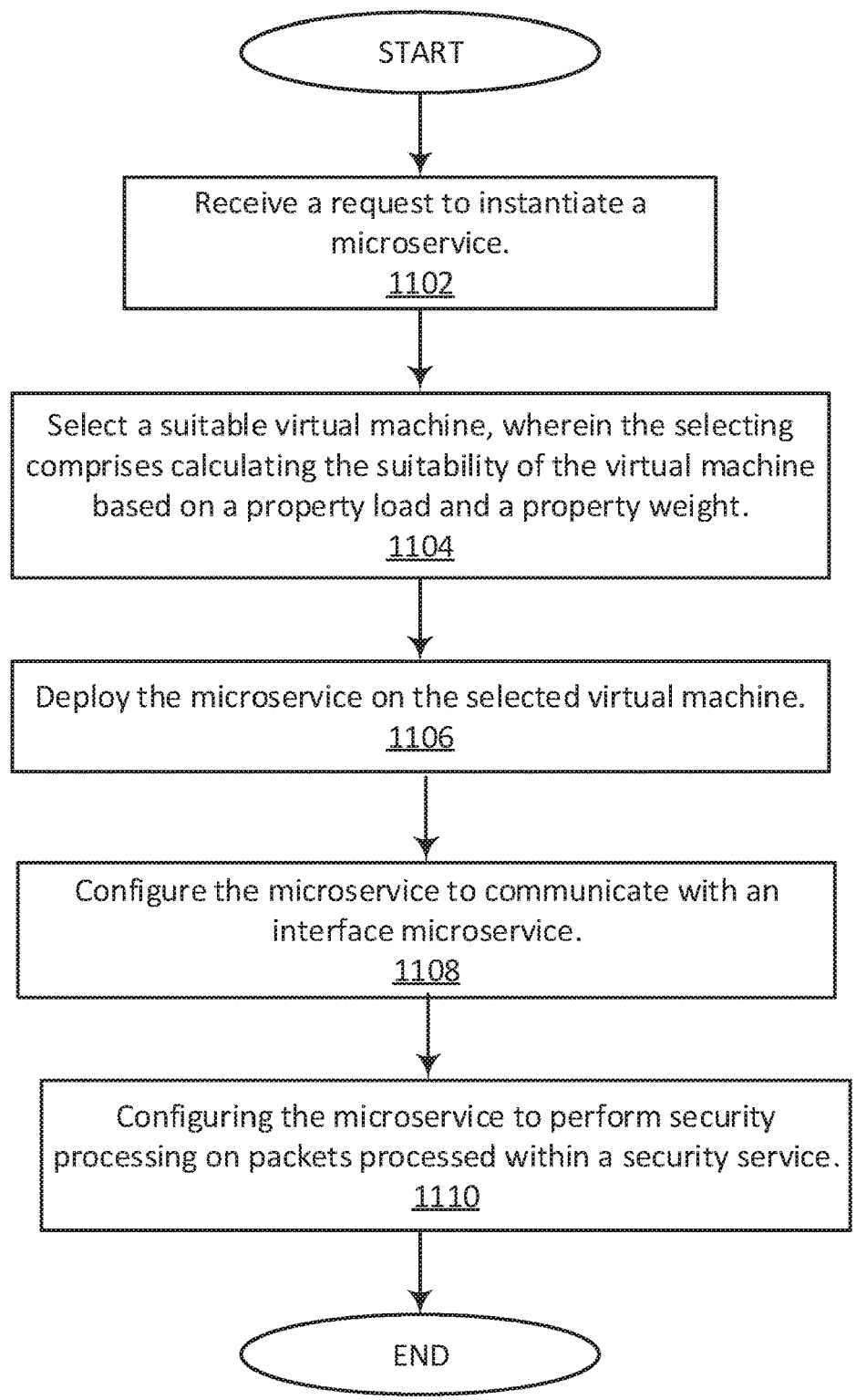
FIG. 11 is a block flow diagram illustrating a method of a configuration microservice deploying and configuring a microservice to perform security processing on a suitable virtual machine within a security hierarchy according to an embodiment.

FIG. 11 is a block flow diagram illustrating a method of a configuration microservice deploying and configuring a microservice to perform security processing on a suitable virtual machine within a security hierarchy according to an embodiment. After starting, at 1102 a request is received to instantiate a microservice. Such a request may originate externally from an administrator or be generated internally by the configuration microservice in response to determining that existing microservices are overloaded. As an example, if all existing DPI microservices are heavily loaded (utilizing all or nearly all of their allocated CPU and memory resources), a configuration microservice may generate (for its own processing) a request to deploy additional DPI microservices. At 1104, a suitable virtual machine is selected, wherein the selecting comprises calculating the suitability of the virtual machine based on a property load and a property weight. In some embodiments, the property load is associated with a server. In some embodiments, the property load is associated with a VM. As an example of the selection process, a configuration microservice seeking to deploy an additional DPI microservice will utilize the service load profile of the DPI microservice to weight the current loading of each server and VM property load for each potential VM onto which the DPI microservice could be deployed. The VM with the lowest weighted load (calculated using the process of FIG. 10) will then be selected for deploying the new DPI microservice. At 1106, the microservice is deployed on the selected virtual machine. At 1108, the microservice is configured to communicate with an interface microservice of the selected VM or of another VM on the same server as the selected VM. In some embodiments, the microservice may be configured before being deployed. For example, a microservice being moved from one server to another may already be configured. At 1110, the microservice is configured to perform security processing on packets processed within a security service.

Embodiments detailed herein allow for the consideration of the anticipated needs of a new microservice when selecting a virtual machine for the new microservice from a plurality of microservices. Microservices may have very different requirement priorities based of whether the expected workloads are dependent on computation, memory, IO or other metric (such as available storage space). If the primary consideration of a microservice is available storage space for logging of events, it is suboptimal to select the least CPU or Memory loaded server for that microservice.

Figure 12:
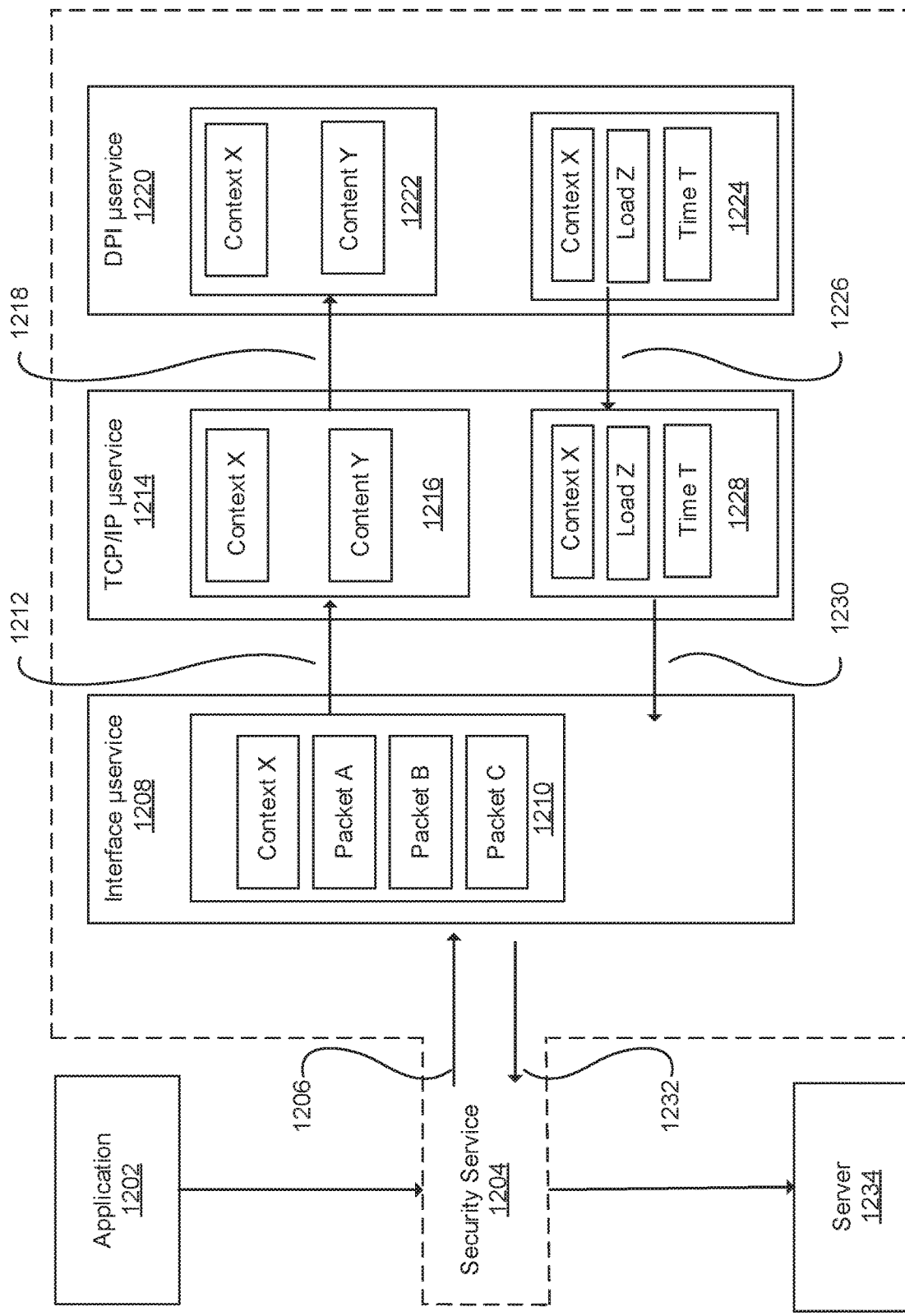
FIG. 12 is a block flow diagram illustrating application data packets traversing to a server after passing through a hierarchy of a security microservices according to an embodiment.

FIG. 12 is a block flow diagram illustrating application data packets traversing to a server after passing through a hierarchy of a security microservices according to an embodiment. As illustrated, the flow begins with security service 1204 receiving a network data packet from application 1202. Security service 1204 forwards 1206 the packet to interface microservice 1208, which generates a channel data encapsulation packet 1210, which encapsulates three packets A, B, and C, and context X. As shown, channel data encapsulation packet 1210 encapsulates three packets, but in alternate embodiments, the number of encapsulated packets may vary, without limitation. In some embodiments, context X is generated based at least on the headers of packets A, B and C. In some embodiments, context X is generated through a lookup of packet header fields such as IP addresses, ports and mac addresses for the source and/or destination of the packets. In some embodiments, the generation of context X includes utilizing an interface identifier obtained from a virtualization environment. Generation of context X may be accomplished through a lookup of header fields and other data in a table, a hash of header fields and other data or another method whereby packets for which a common security policy is to be applied will have a common context or common portion, such as a bit field, of the context.

Context X may be considered an identifier describing the traffic streams, source machines or applications responsible for generating packets A, B and C. This identifier may be direct (such as an ID used as a table look up), indirect (such as a pointer used to access a data structure) or some other method of instructing microservices as to the policies and processing required for handling packets A, B and C. As an example, context X may be generated by performing a hash, longest prefix match or lookup of header fields such as IP addresses, TCP Ports, Interface Names (or MAC Addresses) or other packet properties. The generated context may then be used by security services, such as a DPI service, to determine which rules should be utilized when scanning the data from packets A, B and C (and other packets that are part of the same traffic stream). This information may be embedded within the context (as a bit field or other information), available by indirection (such as a table or data structure lookup by another service) or generated programmatically based on any combination of such information.

Interface microservice 1208 transmits 1212 the channel data encapsulation packet 1210 to TCP/IP microservice 1214. As shown the channel data encapsulation packet 1216 includes context X and content Y, which corresponds to packets A, B, and C of channel data encapsulation packet 1210. After conducting security processing of the channel data encapsulation packet 1216, TCP/IP microservice 1214 transmits 1218 it to DPI microservice 1220. As shown the channel data encapsulation packet 1222 includes context X and content Y, which corresponds to packets A, B, and C of channel data encapsulation packet 1210. After conducting security processing of the channel data encapsulation packet 1222, DPI microservice 1220 generates channel data encapsulation packet, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, DPI microservice 1220 transmits, via path 1226, channel data encapsulation packet 1224 to TCP/IP microservice 1214, which uses the DPI load and DPI timestamp information to inform future load-balancing decisions. As shown, TCP/IP microservice 1214 generates channel data encapsulation packet 1228, which includes context X, TCPI/IP load Z, and TCP/IP Timestamp T. As shown, TCP/IP microservice 1214 transmits, via path 1230, channel data encapsulation packet 1228 to interface microservice 1208, which uses the TCP/IP load and TCP/IP timestamp information to inform future load-balancing decisions. The flow is completed when interface microservice 1208 transmits, via path 1232, packets to security service 1204, which transmits them to server 1234.

The benefits of the security service 1204 include the ability of each microservice to utilize the same channel data encapsulation protocol for all communication, thereby allowing scaling across the entirety of the datacenter network routable via the channel data encapsulation header. Communications between microservices maintain Context X generated at Interface microservice 1208 to all subsequent microservices that no longer have access to the original packets. By providing load and timestamp data in the channel data encapsulation packets 1224 and 1228, which are returned via paths 1226 and 1230, the microservices receive and can maintain real-time loading and processing latency information utilized to make load balancing decisions.

Figure 13:
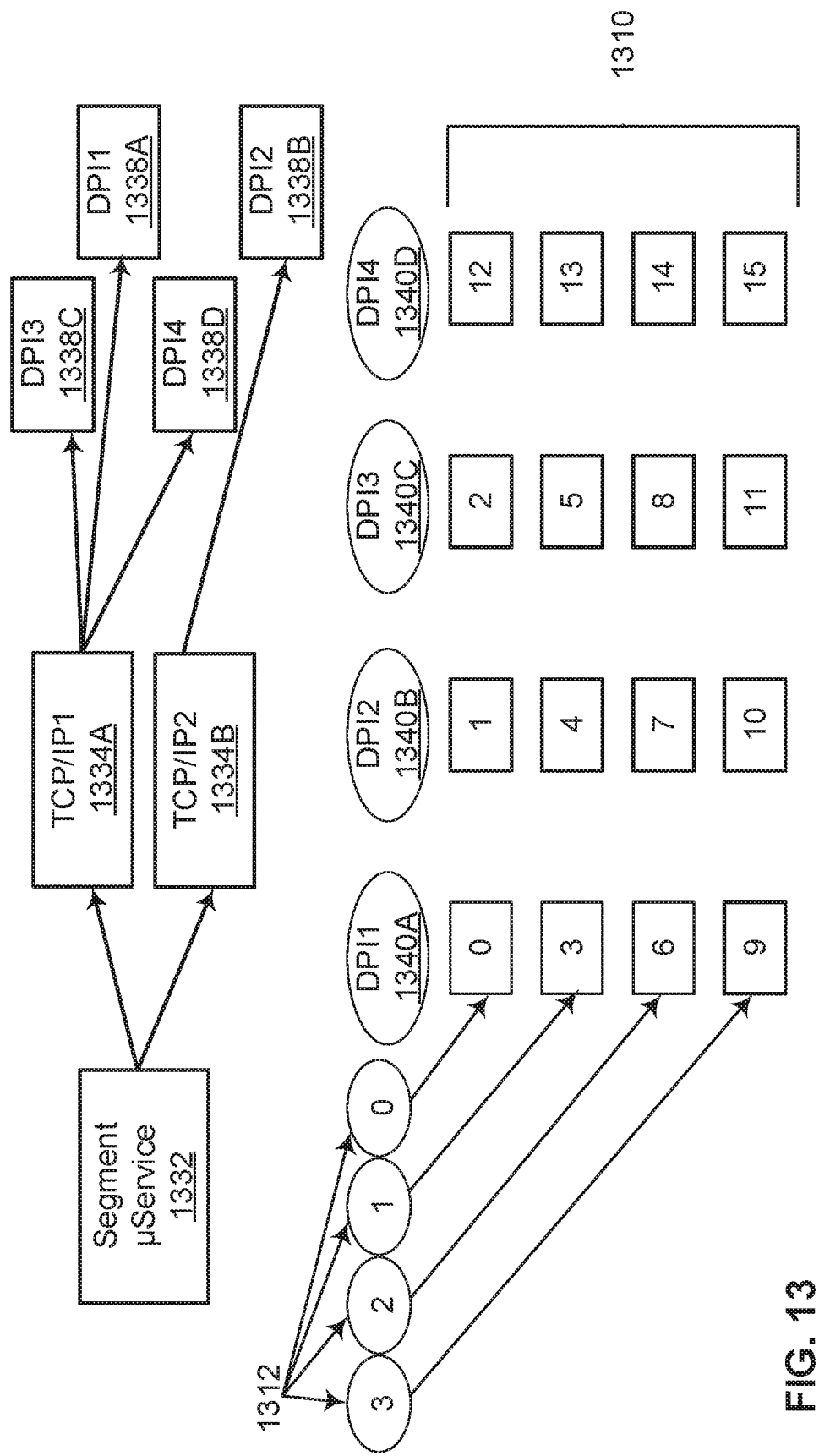
FIG. 13 is a flow diagram illustrating load stacking data packets into microservices queues according to an embodiment.

FIG. 13 is a flow diagram illustrating load stacking data packets into microservices queues according to an embodiment. Some embodiments perform context-based load stacking, which refers to an approach to distribute load among microservices. Illustrated are segment microservice 1332, two instances of TCP/IP microservice 1334A-B, and four instances of DPI microservice 1336A-D. In an embodiment, a configuration microservice deploys the seven microservices, configures them to communicate with each other and with an interface microservice (not shown) via a backplane and configures them to perform security processing on packets processed within a security microservice. Focusing on DPI data queues 1340A-D, each DPI microservice has a queue comprising four "buckets" or "slots" for holding data. The 16 total buckets are labeled as 1310. In an embodiment, incoming data packets 1312 are load-stacked into the first available microservice queue. As used herein, load-stacking refers to loading up a first queue to a threshold level before loading packets into a second queue. Load-stacking has the benefit of minimizing the number of microservices used, such that the unused microservices are powered down to save power. Load-stacking also has the benefit of having substantially empty queues available to support scaling out a microservice. In some embodiments, the four incoming packets are balanced by being spread evenly to all our microservice queues, a load balancing approach enabling the network security system to make do with lower performance microservices.

Figure 14:
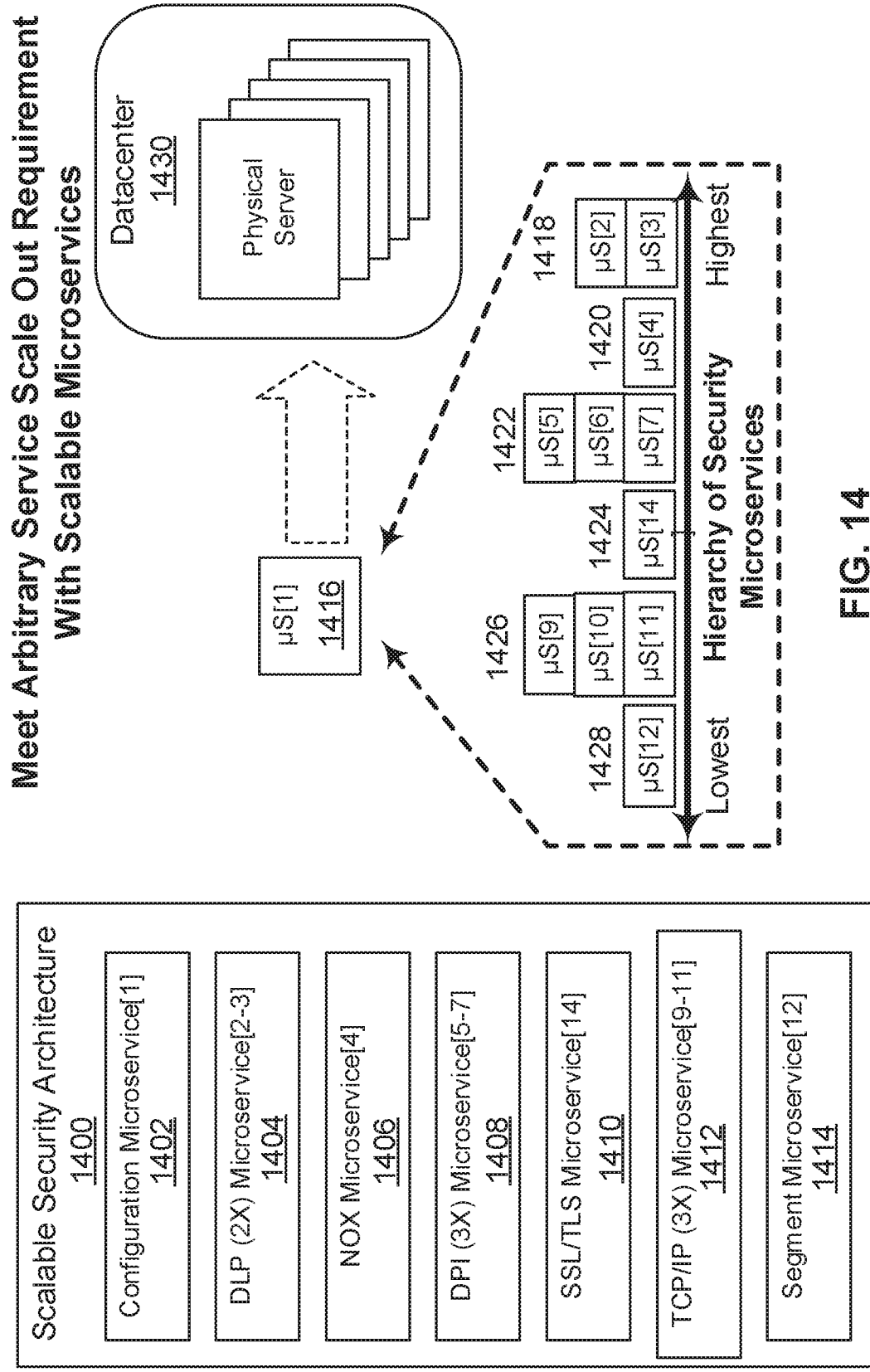
FIG. 14 illustrates meeting an arbitrary scale-out requirement according to an embodiment.

FIG. 14 illustrates meeting an arbitrary scale-out requirement according to an embodiment. As shown, scalable security architecture 1400 includes configuration microservice 1402, DLP microservice 1404 (needing a 2× scale-out), NOX microservice 1406, DPI microservice 1408 (needing a 3× scale-out), SSL/TLS microservice 1410, TCP/IP microservice 1412 (needing a 3× scale-out), and segment microservice 1414. As shown, configuration microservice 1416, deploys the 11 microservices (1418, 1420, 1422, 1424, 1426, and 1428), configures them from a lowest hierarchy to a highest hierarchy, configures them to communicate with each other via backplane, and configures them to perform security processing on packets within a security microservice.

It will be readily apparent to those of ordinary skill in the art that the process disclosed herein for selecting a most appropriate virtual machine for a new microservice may be utilized to select a most appropriate virtual machine for an existing microservice. Such an existing microservice may be currently deployed and operating on another virtual machine or deployed on another virtual machine without being incorporated into the security service (the microservice is started by not receiving and processing security traffic).

Although some embodiments disclosed herein involve data handling and distribution in the context of hardware execution units and logic circuits, other embodiments accomplish the data handling and distribution by way of a data or instructions stored on a non-transitory computer-readable, tangible medium, which, when performed by a machine, cause the machine to perform functions consistent with at least one embodiment. In one embodiment, functions associated with embodiments of the present disclosure are embodied in machine-executable instructions. The instructions cause a general-purpose or special-purpose hardware processor that is programmed with the instructions to perform the steps of the at least one embodiment. Some embodiments detailed herein may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program circuits to perform at least one embodiment are stored within a memory in the system, such as DRAM, cache, flash memory, or other storage. Furthermore, the instructions can be distributed via a network or by way of other computer readable media. Thus a computer-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, computer-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible computer-readable medium suitable for storing or transmitting electronic instructions or information in a form readable by a machine (e.g., a computer).

The above may provide many benefits. As an example, consider an embodiment of an event generator microservice responsible for inserting events into a database upon detection of an anomaly. If executing upon a virtual host with limited disk throughput, the microservice according to an embodiment is configured to weigh event count and disk capacity highly while weighing other aspects of performance, such as CPU, memory or I/O usage, at lower levels. The loading provided by this microservice to lower-level microservices aims to accurately reflect the capabilities of this microservice. Additionally, if the microservice is relocated to a physical service with ample disk capacity but limited memory, the weightings may be reconfigured to increase the memory utilization component while decreasing the disk capacity component of the overall load metric.

What is claimed is:

1. A method performed by a plurality of networked servers each having a memory, a hypervisor, and a plurality of virtual machines (VMs), the method comprising:
measuring central processing unit (CPU), network, and memory utilization of each of the servers;
generating, for each of the VMs, a suitability value comprising a sum of a plurality of weighted server properties each multiplying one of the measured CPU, network, and memory utilization by a weight, and a plurality of weighted VM properties each multiplying a second weight by one of the same properties as the weighted server properties, as seen by the VM;
receiving a request to instantiate microservices of a security service;
selecting the most suitable VM based on the generated suitability values;
deploying the microservices on the selected VM to perform security processing on packets within the security service comprising an interface microservice, a transmission control protocol/Internet protocol (TCP/IP) security microservice, a deep packet inspection (DPI) security microservice, and a secure sockets layer (SSL) security microservice; and
receiving packets and performing security processing by the deployed microservices.

2. The method of claim 1, wherein the interface microservice is to capture network traffic from a physical server.

3. The method of claim 1, wherein when one of the plurality of weighted VM properties is zero, the corresponding weighted server property is to be treated as zero.

4. The method of claim 1, wherein the deploying the microservice includes creating a new microservice.

5. The method of claim 1, wherein the selected virtual machine has been instantiated before the receiving the request.

6. The method of claim 1, wherein the selected virtual machine is a newly instantiated virtual machine.

7. A system comprising:
a plurality of networked servers each having a memory and a plurality of VMs;
a plurality of microservices of a security service running on the plurality of VMs, each microservice to periodically obtain CPU, network, and memory utilization measurements from one or more of: an operating system, a hypervisor, or its own counters and statistics; and
measuring CPU, network, and memory utilization of each of the servers,
wherein the system is to:
generate and maintain CPU, network, and memory utilization statistics;
generate, for each VM, a suitability value comprising a sum of a plurality of weighted server properties each multiplying one of the measured CPU, network, and memory utilization by a weight, and a plurality of weighted VM properties each multiplying a second weight by one of the same properties as the weighted server properties, as seen by the VM;
receive a request to instantiate microservices of the security service;
select the most suitable VM based on the generated suitability values;
deploy the microservices on the selected VM to perform security processing on packets within a security service comprising an interface microservice, a transmission control protocol/Internet protocol (TCP/IP) security microservice, a deep packet inspection (DPI) security microservice, and a secure sockets layer (SSL) security microservice; and
receive packets and perform security processing by the deployed microservices.

8. The system of claim 7, wherein the interface microservice is to capture network traffic from a physical server.

9. The system of claim 7, wherein when one of the plurality of weighted VM properties is zero, the corresponding weighted server property is to be treated as zero.

10. The system of claim 7, wherein the deploying the microservice includes creating a new microservice.

11. The system of claim 7, wherein the selected virtual machine has been instantiated before the receiving the request.

12. The system of claim 7, wherein the selected virtual machine is a newly instantiated virtual machine.

13. A non-transitory computer-readable medium containing instructions that, when performed by a system comprising a plurality of networked servers each having a memory, a hypervisor, and a plurality of virtual machines (VMs), cause the system to respond by:
measuring CPU, memory, and input/output (I/O) utilization of each of the servers;
generating and maintaining CPU, network, and memory utilization statistics;
generating, for each of the VMs, a suitability value comprising a sum of a plurality of weighted server properties each multiplying one of the measured CPU, network, and memory utilization by a weight, and a plurality of weighted VM properties each multiplying a second weight by one of the same properties as the weighted server properties, as seen by the VM;
receiving a request to instantiate microservices of a security service;
selecting the most suitable VM based on the generated suitability values;
deploying the microservices on the selected VM to perform security processing on packets within the security service comprising an interface microservice, a transmission control protocol/Internet protocol (TCP/IP) security microservice, a deep packet inspection (DPI) security microservice, and a secure sockets layer (SSL) security microservice; and
receiving packets and performing security processing by the deployed microservices.

14. The non-transitory computer-readable medium of claim 13, wherein the most suitable VM is not necessarily the least loaded VM.

15. The non-transitory computer-readable medium of claim 13, wherein the interface microservice is to capture network traffic from a physical server.

16. The non-transitory computer-readable medium of claim 13, wherein when one of the plurality of weighted VM properties is zero, the corresponding weighted server property is to be treated as zero.

17. The non-transitory computer-readable medium of claim 13, wherein the deploying the microservice includes creating a new microservice.

18. The non-transitory computer-readable medium of claim 13, wherein the selected virtual machine has been instantiated before the receiving the request.

* * * * *